(12) United States Patent
Furukawa

(10) Patent No.: US 9,313,337 B2
(45) Date of Patent: Apr. 12, 2016

(54) TELEPHONE EXCHANGE SYSTEM, TELEPHONE EXCHANGER, AND INCOMING CALL SWITCHING METHOD

(71) Applicant: NEC Platforms, Ltd., Kawasaki-shi, Kanagawa (JP)

(72) Inventor: Takashi Furukawa, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/647,157

(22) PCT Filed: Feb. 13, 2014

(86) PCT No.: PCT/JP2014/053956
§ 371 (c)(1),
(2) Date: May 26, 2015

(87) PCT Pub. No.: WO2014/129518
PCT Pub. Date: Aug. 28, 2014

(65) Prior Publication Data
US 2015/0304503 A1 Oct. 22, 2015

(30) Foreign Application Priority Data
Feb. 19, 2013 (JP) .................................. 2013-029839

(51) Int. Cl.
*H04M 3/58* (2006.01)
*H04Q 3/00* (2006.01)
(Continued)

(52) U.S. Cl.
CPC ................ *H04M 3/58* (2013.01); *H04Q 3/0029* (2013.01); *H04Q 3/62* (2013.01); *H04W 4/16* (2013.01); *H04Q 2213/13282* (2013.01)

(58) Field of Classification Search
CPC ........... H04M 3/58; H04M 3/54; H04M 4/16; H04M 2207/18; H04M 2203/1091
See application file for complete search history.

(56) References Cited

U.S. PATENT DOCUMENTS

| 6,058,415 | A | 5/2000 | Polcyn |
| 6,587,555 | B1 | 7/2003 | Cripe et al. |
| 2005/0239498 | A1* | 10/2005 | Dorenbosch .......... H04W 76/02 455/552.1 |

FOREIGN PATENT DOCUMENTS

| CN | 102447713 A | 5/2012 |
| CN | 102883293 A | 1/2013 |
| EP | 0987906 B1 | 3/2005 |

(Continued)

OTHER PUBLICATIONS

International Search Report of PCT/JP2014/053956 dated May 27, 2014.

(Continued)

*Primary Examiner* — Curtis Odom
(74) *Attorney, Agent, or Firm* — Sughrue Mion, PLLC

(57) ABSTRACT

Provided is a telephone exchange system including a control unit for conducting, in a case where a forwarding setting is enabled for a telephone terminal or a telephone number that receives a proxy response to an incoming telephone call to a predetermined proxy response destination under a set environment in which a proxy response function is in operation as processing relating to the proxy response, switching control for connecting the incoming telephone call directly to the proxy response destination when the incoming telephone call to the proxy response destination from the telephone terminal or the telephone number of a forwarding destination within the forwarding setting is identified.

10 Claims, 9 Drawing Sheets

(51) Int. Cl.
  *H04Q 3/62* (2006.01)
  *H04W 4/16* (2009.01)

(56) References Cited

FOREIGN PATENT DOCUMENTS

| JP | 61-208955 A | 9/1986 |
| JP | 64-25655 A | 1/1989 |
| JP | 05-75712 A | 3/1993 |
| JP | 09-18910 A | 1/1997 |
| JP | 2000-224304 A | 8/2000 |
| JP | 2009-021769 A | 1/2009 |
| JP | 4957420 B2 | 6/2012 |

OTHER PUBLICATIONS

Written Opinion of the International Searching Authority of PCT/JP2014/053956 dated May 27, 2014.

Communication dated Nov. 2, 2015, from the State Intellectual Property Office of People's Republic of China in counterpart Application No. 201480003486.2.

* cited by examiner

LEADER-SECRETARY LINKING TABLE

| PROXY RESPONSE DESTINATION | EXTENSION NUMBER | STORED POSITION | SECRETARY GROUP | SECRETARY'S EXTENSION | EXTENSION NUMBER | STORED POSITION |
|---|---|---|---|---|---|---|
| LEADER A | 1000 | port :A | GROUP A | EXTENSION a-1 (FIRST SECRETARY) | 1001 | port :a |
| | | | | EXTENSION a-2 (SECOND SECRETARY) | 1002 | port :b |
| | | | | EXTENSION a-3 (THIRD SECRETARY) | 1003 | port :c |
| LEADER B | ... | ... | ... | ... | ... | ... |
| | | | | ... | ... | ... |
| | | | | ... | ... | ... |
| ... | ... | ... | ... | ... | ... | ... |
| | | | | ... | ... | ... |
| | | | | ... | ... | ... |

FIG. 3

ABSENT FORWARDING INFORMATION

| EXTENSION NAME | EXTENSION NUMBER | NUMBER OF ABSENT FORWARDING DESTINATION | |
|---|---|---|---|
| | | (EXTENSION) | (OUTSIDE LINE) |
| EXTENSION a-1 | 1001 | EXTENSION 1234 | 090-XXXX-YYYY |
| EXTENSION a-2 | 1002 | NO SETTING | NO SETTING |
| EXTENSION a-3 | 1003 | NO SETTING | NO SETTING |
| EXTENSION b | 1004 | EXTENSION 3654 | 03-XXYY-XXYY |
| EXTENSION c | 1005 | NO SETTING | NO SETTING |
| . | | . | . |
| . | | . | . |
| . | | . | . |

FIG. 4

DIRECT SWITCHING SETTING TABLE

| PROXY RESPONSE DESTINATION INFORMATION | PROXY RESPONSE SOURCE INFORMATION |
|---|---|
| PROXY RESPONSE DESTINATION A (EXTENSION NUMBER/STORED POSITION) | PROXY RESPONSE SOURCE a-1 (EXTENSION NUMBER/STORED POSITION) |
| PROXY RESPONSE DESTINATION B (EXTENSION NUMBER/STORED POSITION) | PROXY RESPONSE SOURCE b (OUTSIDE-LINE NUMBER) |
| . | . |
| . | . |
| . | . |

FIG. 5

TELEPHONE EXCHANGE SYSTEM, TELEPHONE EXCHANGER, AND INCOMING CALL SWITCHING METHOD

CROSS REFERENCE TO RELATED APPLICATIONS

This is a National Stage of International Application No. PCT/JP2014/053956 filed Feb. 13, 2014, claiming priority based on Japanese Patent Application No. 2013-029839 filed Feb. 19, 2013, the contents of all of which are incorporated herein by reference in their entirety.

TECHNICAL FIELD

This invention relates to a telephone exchange technology, and more particularly, to a telephone exchange system for operating a connection destination such as an incoming telephone call based on a predetermined setting.

BACKGROUND ART

In recent years, a telephone exchange system has a function of forwarding an incoming call to a predetermined telephone number to another telephone terminal in a manner set in advance.

Related art is disclosed in, for example, Patent Document 1. In Patent Document 1, there is disclosed a technology relating to a telephone exchange for forwarding an incoming call to another telephone set (number) in advance. Further, in the above-mentioned document, there is disclosed, as a secretarial function, a mechanism in which a relationship between a main telephone set and a sub-telephone set is registered in advance in the telephone exchange, to thereby call the sub-telephone set in response to a call to the number of the main telephone set. Further, there is disclosed a mechanism that facilitates a confirmation of presence/absence of a missed incoming call to the main telephone set and a connection to the sub-telephone set.

Further, in Patent Document 2, there is disclosed a mechanism of the telephone exchange system capable of discriminating which telephone terminal (number) an incoming call emitting sound is addressed to by a telephone set (proxy response source terminal) for conducting a proxy response as a part of a proxy response function so as to suit the secretarial function or the like. Specifically, there is disclosed a mechanism that provides, when a private branch exchange (PBX) causes a given telephone terminal to emit sound, display indicating a proxy response destination terminal to the telephone terminal to be caused to emit sound in a case where the incoming call is addressed to the proxy response destination terminal (number).

PRIOR ART DOCUMENTS

Patent Document

Patent Document 1: JP-A-H5-75712
Patent Document 2: JP-A-H9-18910

SUMMARY OF THE INVENTION

Problems to be Solved by the Invention

As described above, a telephone exchange system provides a function of proxy-responding to an incoming call to one or a plurality of predetermined telephone numbers. To conduct this proxy response, a telephone exchange or the like identifies an extension number or an outside-line number set in advance in internal or external storage means in a format of table information or the like, and subjects the incoming call to forwarding processing.

Further, the telephone exchange system provides a sliding-forwarding function of calling a call destination set in this proxy response while sequentially sliding the call destination among a plurality of telephone numbers (extension numbers or outside-line numbers) in a predetermined order. This sliding-forwarding function is used to proxy-respond to an incoming call to one or a plurality of predetermined telephone numbers within a predetermined group for secretarial work or the like.

Further, the telephone exchange system provides a function of directly connecting even an incoming call to a predetermined telephone number for which the proxy response is set without forwarding the incoming call to a proxy-responding telephone terminal on condition that the incoming call is from a predetermined number set in advance. In the secretarial work, a secretary uses this direct connection function to relay a call source such as a customer to a proxy response destination such as his/her superior. Without this direct connection function, under a condition that the sliding-forwarding function is in operation, there is a problem in that the secretary cannot directly telephone the proxy response destination due to the sliding-forwarding function.

In each function of the proxy response, a telephone device (number) that proxy-responds is set in advance generally in units of persons or groups.

However, there is a problem in that the telephone device (number) in which a person or group that is to receive forwarding is set in advance cannot be used at all times for a variety of reasons.

In a simple case example, the set telephone terminal or number cannot be used only by moving from a working room to a meeting room. Further, a predetermined telephone terminal or number cannot be used even while working outside at another office or during an off-duty hour. Further, even when an unintended telephone conversation with a proxy response source is requested on the road or the like, it is not possible to directly connect to the proxy response source.

Further, when a sliding function is in operation, there is further another problem. For example, even when the secretary calls the number of the proxy response destination from an extension telephone, a cellular phone, or the like in the meeting room, a sliding operation is sequentially conducted within a secretary group, and hence it is not possible to directly call the proxy response destination.

On the other hand, in consideration of an operational aspect, an individual in charge of the proxy response often has authority given to himself/herself from the proxy response destination or an organization. To give an example, the individual is authorized as the secretary.

Further, in consideration of internal rules formed so as to pass the incoming call to an engineering department through sales staff in charge thereof, a sales representative is given authority as to whether or not to connect a telephone call from a customer or the like to the engineering department.

Further, it can be requested to connect directly to a leader or the engineering department from a telephone terminal or telephone number in which the secretary as in the above-mentioned case example or a person in charge is not set in advance. For example, there may be a future demand for a mechanism capable of carrying out the secretarial work even when not all members of a secretarial section are present in their office.

This invention provides a telephone exchange system capable of notifying a proxy response requester of an incoming call to a predetermined proxy responder to be subjected to the proxy response directly from an arbitrary telephone terminal.

Further, this invention provides a telephone exchange system capable of connecting directly to the proxy response requester from an arbitrary telephone terminal set by the predetermined proxy responder.

Means to Solve the Problems

According to one embodiment of this invention, there is provided a telephone exchange system, including a control unit, in a case where a forwarding setting is enabled for a telephone terminal or a telephone number that receives a proxy response to an incoming telephone call to a predetermined proxy response destination under a set environment in which a proxy response function is in operation, switching control for connecting the incoming telephone call directly to the predetermined proxy response destination when the incoming telephone call to the predetermined proxy response destination from the telephone terminal or the telephone number of a forwarding destination within the forwarding setting is identified.

According to one embodiment of this invention, there is provided a telephone exchange, including: a proxy response unit to allow a predetermined number to be set as a proxy response destination based on information set in advance, and to forward an incoming telephone call to the predetermined number to a telephone terminal or a number associated with the proxy response destination as a proxy response source; a forwarding unit to forward a call corresponding to the incoming telephone call to the telephone terminal or the number serving as the proxy response source to the telephone terminal or the number based on a forwarding setting set by a proxy responder; and a switching unit to identify, when the forwarding setting is enabled in the telephone terminal or the telephone number that receives a proxy response to the incoming telephone call to a predetermined proxy response destination under a set environment in which the proxy response unit is in operation, whether or not the incoming telephone call is the incoming telephone call to the predetermined proxy response destination from the telephone terminal or the telephone number of a forwarding destination within the forwarding setting, and to connect directly the predetermined proxy response destination and the incoming telephone call from the telephone terminal or the number indicated in the forwarding setting.

According to one embodiment of this invention, there is provided an incoming call switching method, including, switch by a control unit of a telephone exchange system for an incoming telephone call in which a proxy response function is in operation, when an incoming call is identified, switching control for conducting, in a case where a forwarding setting is enabled for a telephone terminal or a telephone number that receives a proxy response to the incoming call, to connecting to the incoming call directly to a proxy response destination when the incoming call to a proxy response destination from the telephone terminal or the telephone number of a forwarding destination within the forwarding setting is identified.

Effect of the Invention

According to the one embodiment of this invention, it is possible to provide the telephone exchange system capable of notifying the proxy response requester of the incoming call to the predetermined proxy responder to be subjected to the proxy response directly from the arbitrary telephone terminal.

Further, according to the one embodiment of this invention, it is possible to provide the telephone exchange system capable of connecting directly to the proxy response requester from the arbitrary telephone terminal set by the predetermined proxy responder.

BRIEF DESCRIPTION OF THE DRAWING

FIG. 3 is an explanatory diagram showing a leader-secretary linking table used in an embodiment of this invention.

FIG. 4 is an explanatory diagram showing table information indicating an absent forwarding destination set for each individual secretarial telephone which is used in the embodiment.

FIG. 5 is an explanatory diagram showing a management table relating to a direct switching setting of an extension set as a forwarding destination which is used in the embodiment.

MODE FOR EMBODYING THE INVENTION

Now, an embodiment mode of this invention is described with reference to the accompanying drawings.

[First Embodiment Mode]

The embodiment mode of this invention is described with reference to FIG. 1 and FIG. 2.

Figure 1A:
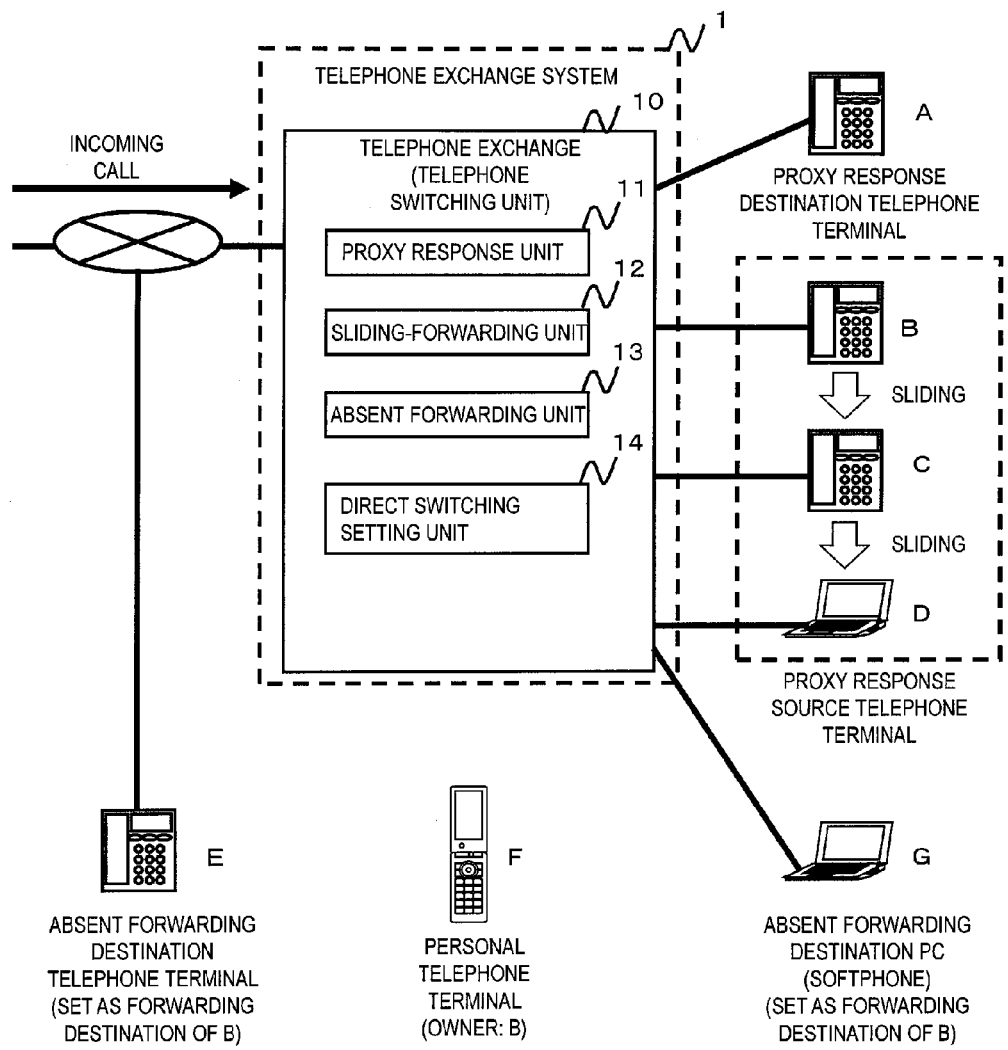
FIG. 1A is a schematic diagram illustrating a telephone exchange system and an example of a peripheral environment thereof according to one embodiment mode of this invention.
Figure 1B:
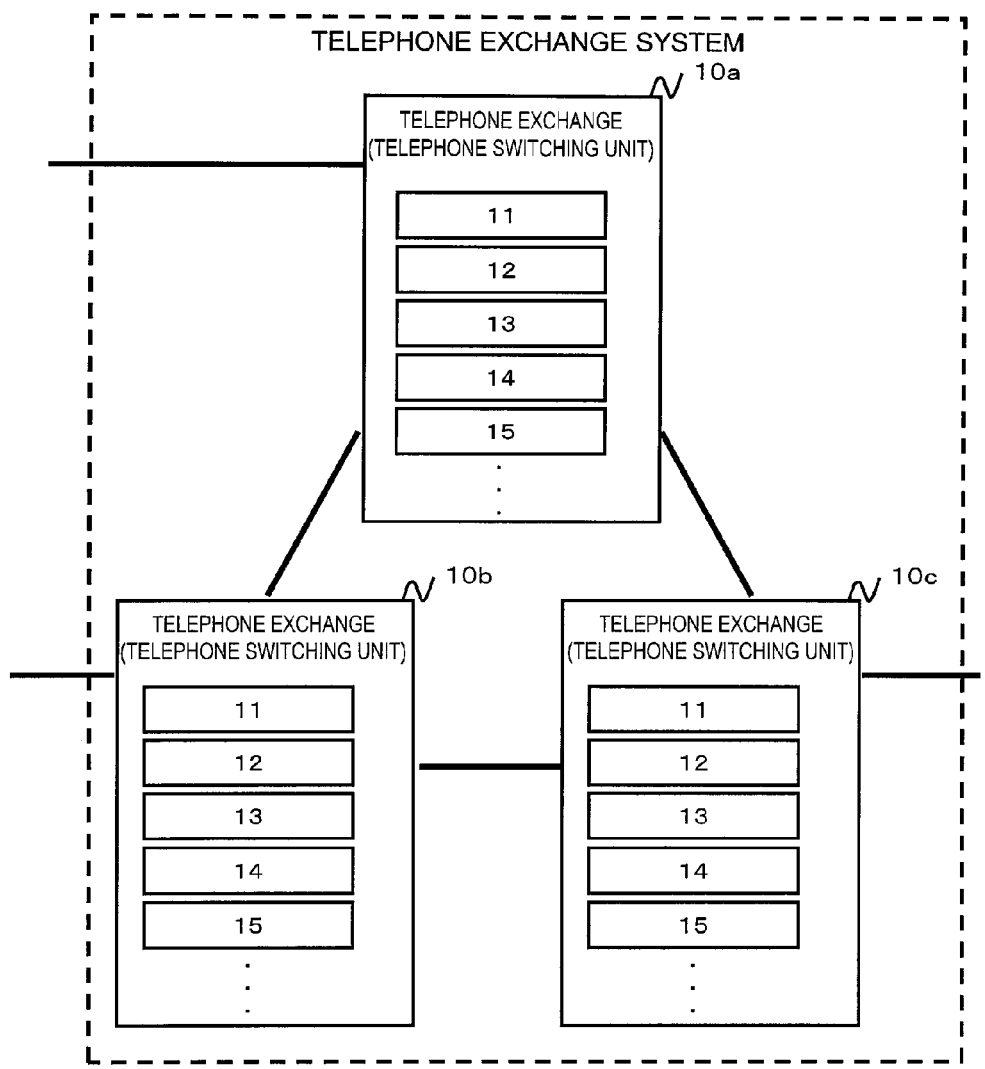
FIG. 1B is a schematic diagram illustrating another telephone exchange system according to the one embodiment mode.

FIG. 1A and FIG. 1B are schematic diagrams illustrating a telephone exchange system 1 according to one embodiment mode of this invention.

As illustrated in FIG. 1A, the telephone exchange system 1 is arbitrarily prepared with connections and settings in advance so as to be connectable to a plurality of telephone terminals (A to G) along with an outside line. Note that, the telephone exchange system according to this invention may be constructed of one telephone exchange 10 as illustrated in FIG. 1A, or may be constructed as a cooperative distributed telephone exchange system in which a plurality of telephone exchanges operate in cooperation with one another as illustrated in FIG. 1B. Further, examples of the telephone terminal to be connected thereto may include a key telephone, an IP telephone (voice over IP (VoIP) telephone), a personal handy-phone system (PHS), a cellular phone, and a softphone.

In the telephone exchange 10, a proxy response unit 11, a sliding-forwarding unit 12, an absent forwarding unit 13, and a direct switching setting unit 14 for enabling a direct connection to a proxy response destination without conducting sliding-forwarding under a predetermined condition are formed as control units relating to switching control of a call.

The proxy response unit 11 is operated to allow a predetermined number to be set as the proxy response destination based on information set in advance, and forward an incoming call to the predetermined number to a telephone terminal or number associated therewith as a proxy response source.

The sliding-forwarding unit 12 is operated to forward a call to a predetermined telephone terminal or number corresponding to the incoming call to a different telephone terminal or number in a predetermined order with a lapse of time based on information set in advance. In this case, for example, when a prioritized telephone terminal is busy during the telephone conversation, the connection is made to the next prioritized telephone terminal.

The absent forwarding unit 13 is operated to forward the incoming call to the telephone terminal or number serving as the proxy response source based on a forwarding setting set by a proxy responder or the like. The absent forwarding unit 13 retains the forwarding setting corresponding to each individual telephone terminal or number. The absent forwarding unit 13 may be configured to forward the incoming call instantaneously, or may be configured to forward the incoming call after the calling lasts for a predetermined time period. When the telephone exchange system is constructed of a plurality of exchanges as illustrated in FIG. 1B, each thereof is configured to include a forwarding setting exchange unit 15 for exchanging this forwarding setting among the telephone exchanges. Further, the forwarding setting may be managed by a database shared by the plurality of telephone exchanges for use.

The direct switching setting unit 14 identifies, when the forwarding setting is enabled for the telephone terminal or telephone number that receives the proxy response to the incoming call to a predetermined proxy response destination under a set environment in which both the proxy response unit 11 and the sliding-forwarding unit 12 are in operation, whether or not the incoming call is a connection call to the proxy response destination from a forwarding-destination telephone terminal or forwarding-destination number included in this forwarding setting. The direct switching setting unit 14 is operated to identify a call source of the connection call, and when the connection call is the incoming call from the telephone terminal or number indicated in the above-mentioned forwarding setting, connect the connection call directly to the proxy response destination without executing sliding-forwarding processing.

With this configuration, the telephone exchange system 1 conducts, in the case where the forwarding setting is enabled for the telephone terminal or telephone number that receives the proxy response to the incoming call to the predetermined proxy response destination under the set environment in which both the proxy response function and the sliding-forwarding function are in operation, switching control for connecting the incoming call directly to the proxy response destination when the incoming call to the proxy response destination from the forwarding destination within the forwarding setting is identified.

In the processing relating to the switching control for connecting the incoming call directly to the proxy response destination, it suffices that, when the incoming call to the proxy response destination is identified, presence/absence of the forwarding setting enabled for the telephone terminal or telephone number that receives the proxy response set in the proxy response destination is identified, and discrimination is conducted by comparing the call source of the incoming call with the forwarding setting.

This forwarding processing relating to this direct switching may be carried out only for a top-priority telephone terminal or telephone number in the sliding-forwarding function, or may be set for one or a plurality of telephone terminals assigned the next priority and the subsequent priorities in the sliding-forwarding function.

Further, in a case where there is a forwarding setting enabled for a top-priority forwarding destination, when there is no response to the call forwarding while the forwarding is conducted in accordance with the forwarding setting, control processing may be executed to forward the incoming call to the next-prioritized sliding-forwarding destination.

By executing those kinds of forwarding processing successively, it is possible to directly notify a proxy response requester of an incoming call to the predetermined proxy responder to be subjected to the proxy response from an arbitrary telephone terminal.

In addition, it is possible to connect directly to the proxy response requester from an arbitrary telephone terminal set by the predetermined proxy responder.

Next, an operation example relating to the proxy response is described. Note that, the description is directed to an incoming call from subscriber telephone, but the incoming call from the IP telephone or the like may be similarly identified and determined to be subjected to connection control processing.

Figure 2:
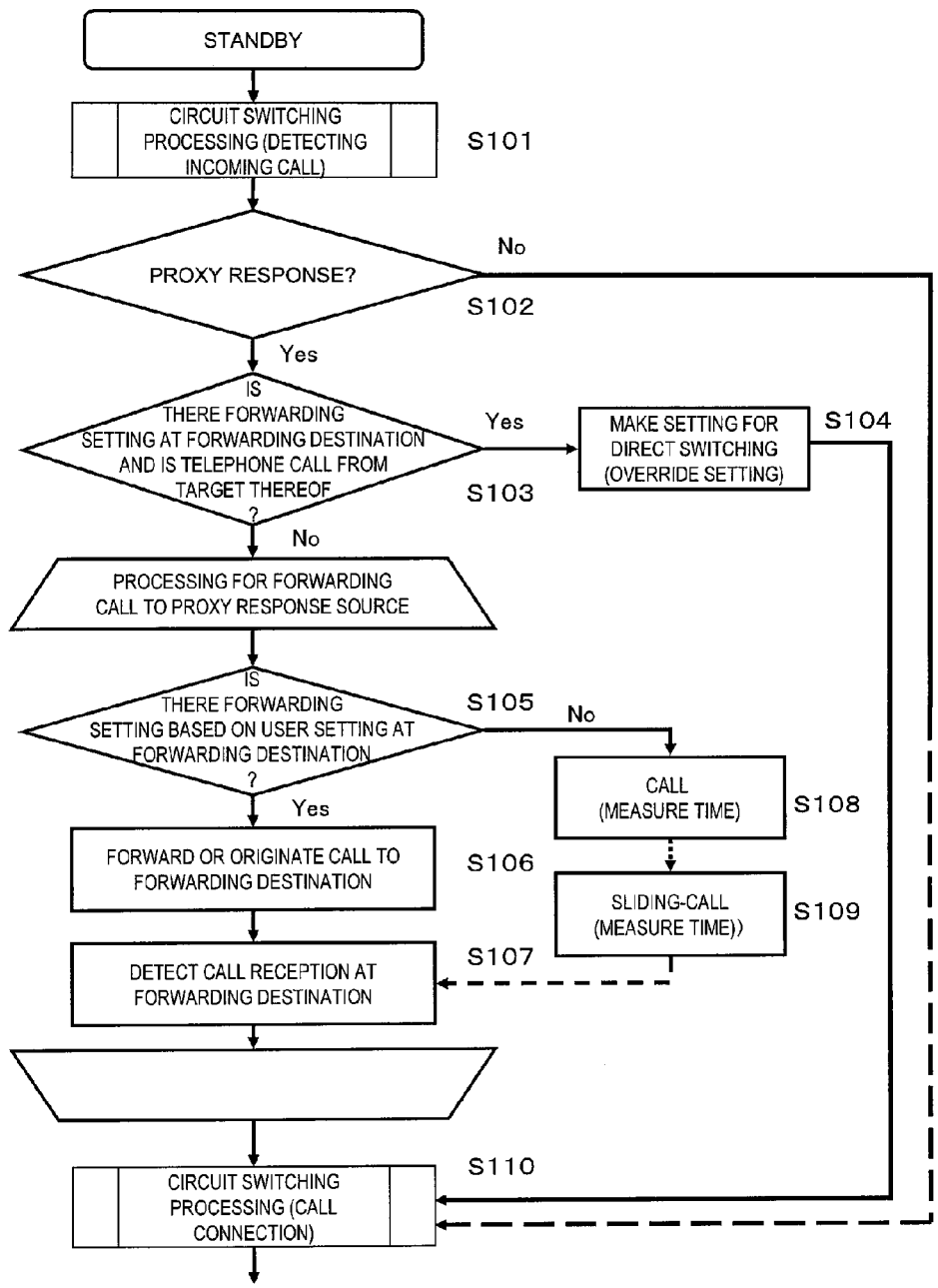
FIG. 2 is a flowchart illustrating an operation example relating to a proxy response of the telephone exchange system according to the one embodiment mode.

FIG. 2 is a flowchart illustrating an operation example relating to the proxy response of the telephone exchange system 1.

The telephone exchange system 1 (control unit) detects an incoming call in a standby state in which each kinds of functions is in operation (S101).

Subsequently, in accordance with the detection of the incoming call, the proxy response unit 11 of the telephone exchange system 1 identifies a destination number of the detected incoming call and discriminates whether or not the destination number is a proxy response target (S102). When the destination number is the proxy response target (Yes), the procedure advances to processing for forwarding a call to the proxy response source. When the destination number is not the proxy response target (No), the procedure advances to the subsequent processing of circuit switching in accordance with another function or the like.

The direct switching setting unit 14 of the telephone exchange system 1 identifies a content of the forwarding setting of the forwarding destination that proxy-responds to the incoming call, discriminates whether or not there is a match between a call source number of the incoming call and a number included in the identified forwarding setting (S103), and when there is a match (Yes), changes to a setting for direct switching (S104). On the other hand, when there is not a match (No), the incoming call is forwarded to the proxy response source.

As the processing for forwarding the call to the proxy response source, the telephone exchange system 1 operates the sliding-forwarding unit 12 and the absent forwarding unit 13 to forward the incoming or terminating call to the proxy response source set in advance based on a forwarding rule (S105 to S109).

The telephone exchange system 1 carries out circuit switching for connecting the incoming or terminating call in accordance with call reception or the like at a destination defined in each kind of setting (S110).

In this case, in order to connect to the proxy response destination after responding to the incoming or terminating call with the telephone terminal at the forwarding destination in accordance with the forwarding setting, a user such as a secretary may originate a new call to the proxy response destination while causing the telephone terminal or the telephone exchange 10 to hold the call reception. This originating the new call can be connected directly to the proxy response destination in the above-mentioned processing of Step S103. Further, after connecting to the proxy response destination, the user conveys existence of the previous call (holding call) being held, and when a proxy-response-destination telephone terminal connects to the holding call, it is possible to connect to the initial incoming call. Further, the holding call may be connected to the proxy-response-destination telephone terminal from a forwarding-destination telephone terminal side. Note that, even in a case of holding the call within the telephone exchange 10, it is not always necessary to disconnect the call (forwarding call) connecting to the telephone terminal at the forwarding destination from the telephone exchange 10.

Further, it is desired that the direct switching setting unit 14 has a mechanism for identifying the previous holding call and the number of the identified forwarding setting and connecting to the holding call with ease. This mechanism can employ a direct special number for the holding call. Further, when there is an incoming call at the proxy response source from the telephone terminal called in accordance with the forwarding setting within a predetermined time period from a timing at which the above-mentioned holding is started or while the initial call exists, the incoming call may be automatically connected to the holding call. Further, the direct switching setting unit 14 may have the mechanism in which when there is an incoming call at the proxy response destination from the called telephone terminal, guidance and DTMF, speech recognition, or the like are used to allow a caller to select a connection destination between the proxy response destination or the holding call. Further, on the telephone exchange side, a holding call can be managed each time by using a proxy response destination number or a number of an initial call originator as an additional number.

By the above-mentioned operation, in the telephone exchange system 1, it is possible to directly notify the proxy response requester of a forwarding call to the telephone terminal of the predetermined proxy responder from an arbitrary telephone terminal. Further, in the telephone exchange system 1, it is possible to connect an arbitrary telephone terminal set by the predetermined proxy responder directly to the proxy response requester. Specifically, based on the forwarding setting enabled by the user of the telephone terminal B illustrated in FIG. 1A, it is possible to conduct the proxy response, the call to the telephone terminal A, the connection between the telephone terminal A and the call originator, and the like, by using the telephone device E, the cellular phone F, and the softphone G.

[Embodiment]

Next, this invention is described by illustrating an embodiment of this invention. This embodiment is directed to an example in which secretarial telephone work can be continued even in another meeting room in a secretarial telephone service implemented on a private branch exchange (PBX).

A current secretarial telephone service system is provided with the proxy response function and the sliding-forwarding function for a service in which a plurality of secretaries are in charge of secretarial work for one leader or one secretary is in charge of the secretarial work for a plurality of leaders. Further, a forwarding function to be set by the secretary or the like when being away from his/her desk is separately provided to the secretarial telephone service system.

In this embodiment, as shown in FIG. 3 to FIG. 5, settings relating to respective kinds of forwarding are enabled in the private branch exchange in advance by using a table information format.

FIG. 3 shows a leader-secretary linking table. In accordance with this table information, the proxy response processing and the sliding-forwarding processing involved in the secretarial telephone service are carried out.

FIG. 4 shows table information indicating an absent forwarding destination set for each individual secretarial telephone. In accordance with this table information, the forwarding processing involved in an absent forwarding service is carried out.

FIG. 5 shows a management table relating to a direct switching setting of an extension set as the forwarding destination. In this table information, the forwarding destination (such as extension "1234" or outside line "090-XXXX-YYYY") is linked to the proxy response destination (extension number or storage destination). Further, when the holding call is managed, a holding number, terminating call information (such as caller number), information on a function of the forwarding destination, and the like may be stored in this table in association with one another. This information is used for the operation in synchronization when the forwarding setting is enabled/disabled on an individual telephone device.

When each individual leader that receives the proxy response enables a setting for a "proxy response request" from the telephone device, in accordance with the table information shown in FIG. 3, the operation is carried out so as to cause a secretary group for which the incoming call to each leader is set to proxy-respond thereto. This secretary group is set so as to call the telephone terminals of the secretaries in a prioritized order while identifying a free line in order of precedence in which the incoming call to a leader A is handled by "first secretary→second secretary→third secretary→ . . . ".

The linking between the telephone device of the leader and the telephone device of the secretary, a sliding order thereof, and the like may be set in advance in the private branch exchange by a system administrator. Further, each setting may be made by the leader and the secretary. Further, a computer telephony integration (CTI) system or the like may be used to make the settings and manage the operation of the system.

The telephone exchange system is provided with a mechanism in which the leader is directly called without the forwarding to the secretary group as described above in the above-mentioned embodiment mode when the leader is called from the telephone terminal of the secretary in a state in which the "proxy response request" is set for the telephone terminal of the leader, and the operation based on this mechanism is referred to as an "incoming call override".

When the secretary is away from his/her desk due to a business such as a meeting, the secretary changes the table information shown in FIG. 4 to set the extension of the meeting room as the absent forwarding destination, and when the secretary goes out, sets his/her own cellular phone as the absent forwarding destination, to receive the incoming call to the leader on the extension or the cellular phone set as the absent forwarding destination. Further, the telephone exchange system is provided with a mechanism for forwarding the incoming call to the leader in response to the talker's request.

By incorporating those configurations into the telephone exchange system, with reference to a direct switching setting table, it is possible to allow the secretary to receive the incoming call from the cellular phone or the extension of the meeting room set by the secretary without conducting a "sliding operation" toward the secretary group unlike a general call. Further, it is possible to relay the incoming call directly to the leader.

Further, when a call to the leader is originated from the cellular phone or the extension of the meeting room, in the same manner as described above, it is possible to call the telephone terminal of the leader without conducting the "sliding operation" toward the telephone terminal of the secretary.

In this manner, when the telephone terminal of the leader at the proxy response destination is called from the telephone terminal of the secretary by regarding the forwarding destination within the forwarding setting set by the secretary as the "telephone terminal of the secretary", it is possible to allow the "incoming call override" on the telephone terminal of the leader without conducting the sliding operation toward another secretary.

Figure 6:
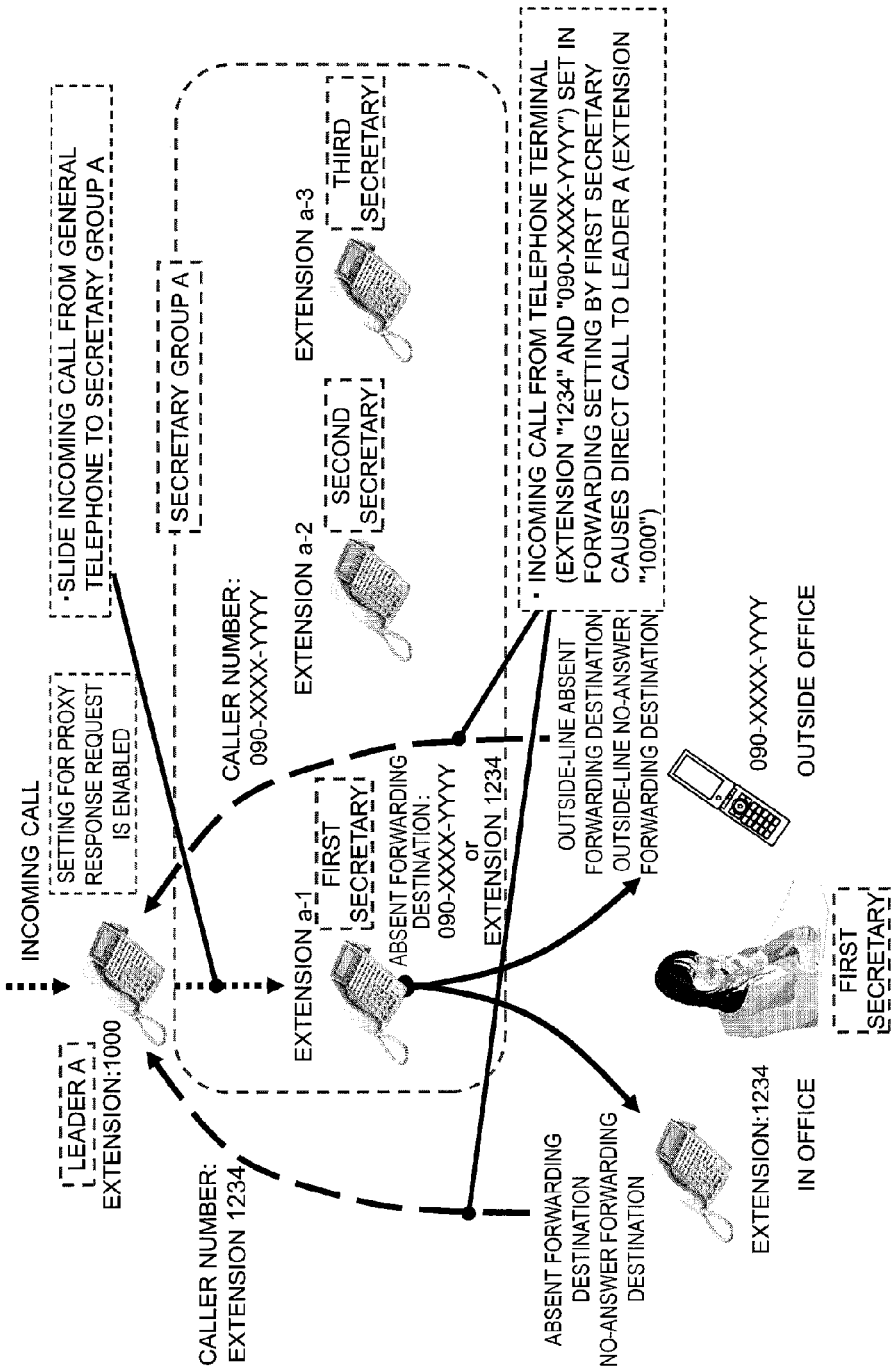
FIG. 6 is an explanatory diagram illustrating a processing concept of the telephone exchange system employed when an incoming call is received from an outside line.

FIG. 6 is an explanatory diagram illustrating a processing concept of the telephone exchange system employed when an incoming call is received from the outside line. A description is made of an operation for conducting the "incoming call override" from the absent forwarding destination (extension or cellular phone) of the secretary as in the processing concept illustrated in FIG. 6.

(1) The private branch exchange subjects the incoming call to the leader A (extension: "1000") for which the "proxy response request" is set to the "sliding operation" toward a secretary group A. In this case, when absent forwarding is set for the first secretary (extension a-1) of the leader A, the private branch exchange refers to the direct switching setting table (see FIG. 5) or the like to execute comparison processing between the telephone number of the incoming call or the like and the set telephone number or the like, to thereby discriminate whether to subject the incoming call directly to the "incoming call override" or to forward the incoming call to the set destination without conducting the "sliding operation". When the incoming call is to be forwarded to the set destination, the private branch exchange calls the telephone terminal being used by the first secretary as a new call.

(2) In a case where the leader A is called from the absent forwarding destination (for example, extension "1234"), the private branch exchange refers to each table information to regard the incoming call as being received from the "telephone terminal of the secretary" when the absent forwarding destination (extension "1234" or "090-XXXX-YYYY") set for the extension (extension a-1) of the secretary matches the telephone number of the incoming call, to thereby call the telephone terminal of the leader A by conducting the "incoming call override" to the proxy response destination (extension "1000") without conducting the "sliding operation" toward the secretary group A. When the call is originated from the extension, it is not always necessary to use the telephone number. For example, the telephone terminal may be identified by the stored position, an IP address, a terminal name, or the like on the private branch exchange.

Figure 7:
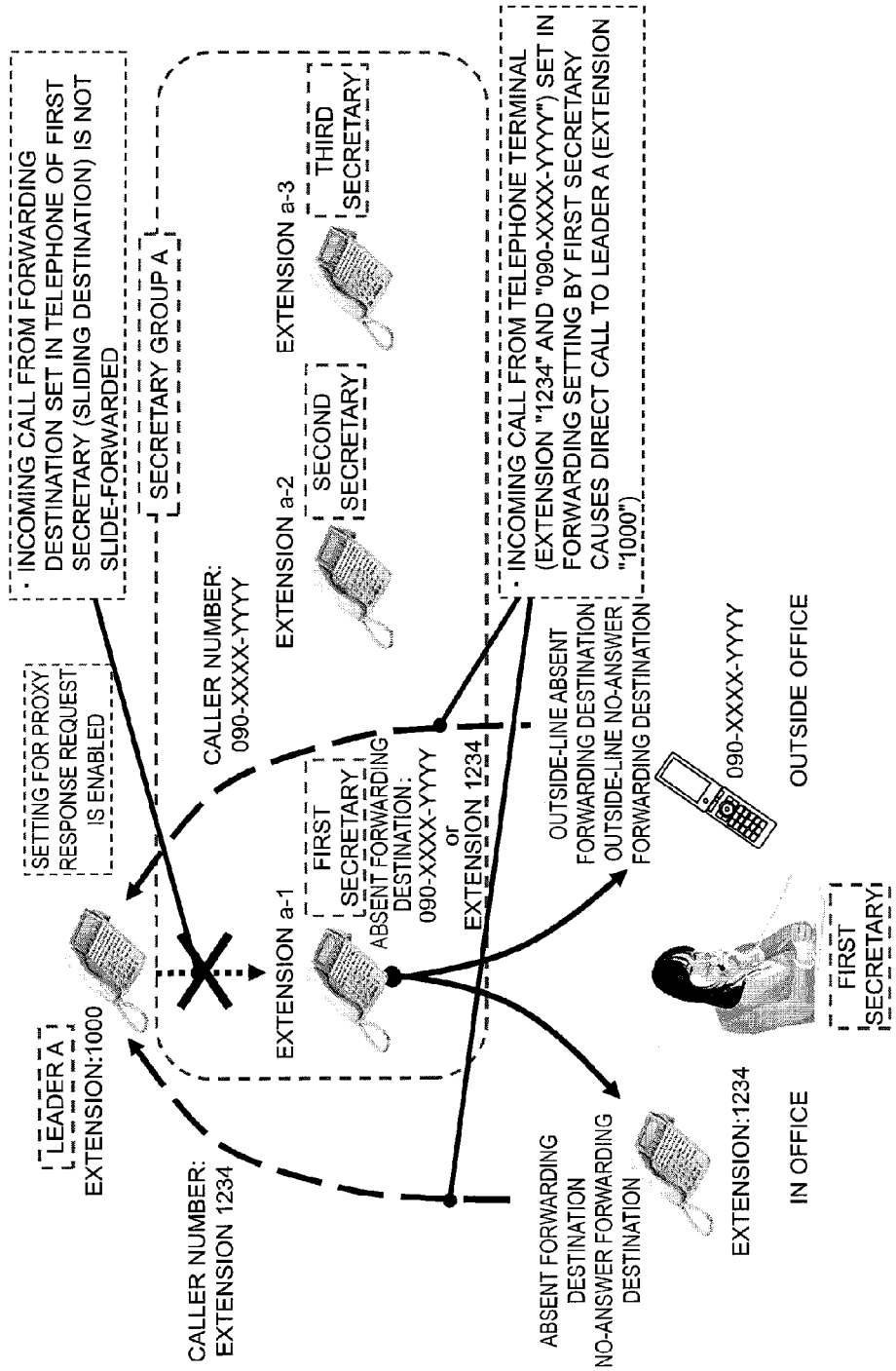
FIG. 7 is an explanatory diagram illustrating a processing concept of the telephone exchange system employed when a proxy response destination is called directly from the absent forwarding destination of a proxy response source.

FIG. 7 is an explanatory diagram illustrating a processing concept of the telephone exchange system employed when the proxy response destination is called directly from the absent forwarding destination of the proxy response source. A description is made of an operation for conducting the "incoming call override" from the absent forwarding destination (extension or cellular phone) of the secretary as in the processing concept illustrated in FIG. 7.

(1) When the leader A (extension "1000") is called from the absent forwarding destination (for example, the extension "1234"), the private branch exchange refers to each table information to execute the comparison processing between the telephone number of the incoming call or the like and the absent forwarding destination (extension "1234" or "090-XXXX-YYYY") set for the first secretary (extension a-1). When there is a match between the numbers, the private branch exchange calls the telephone terminal of the leader A by subjecting the incoming call to the "incoming call override" to the proxy response destination (extension "1000") without conducting the "sliding operation" toward the secretary group A.

By thus operating the private branch exchange, it is possible to provide the secretarial telephone service that allows the secretarial telephone work to continue from the extension of another meeting room or the like and the cellular phone on the road.

It is technically possible that various telephone terminals available in recent years use a mechanism capable of originating another call during the telephone conversation. This function depends on the telephone terminal's own function and a line-side service. Examples thereof include a 3-way calling service carried out through an ISDN or mobile communications.

Now, a description is made of a secretarial function exhibiting convenience that is further increased by use of a telephone terminal having a mechanism capable of using two lines simultaneously.

Figure 8:
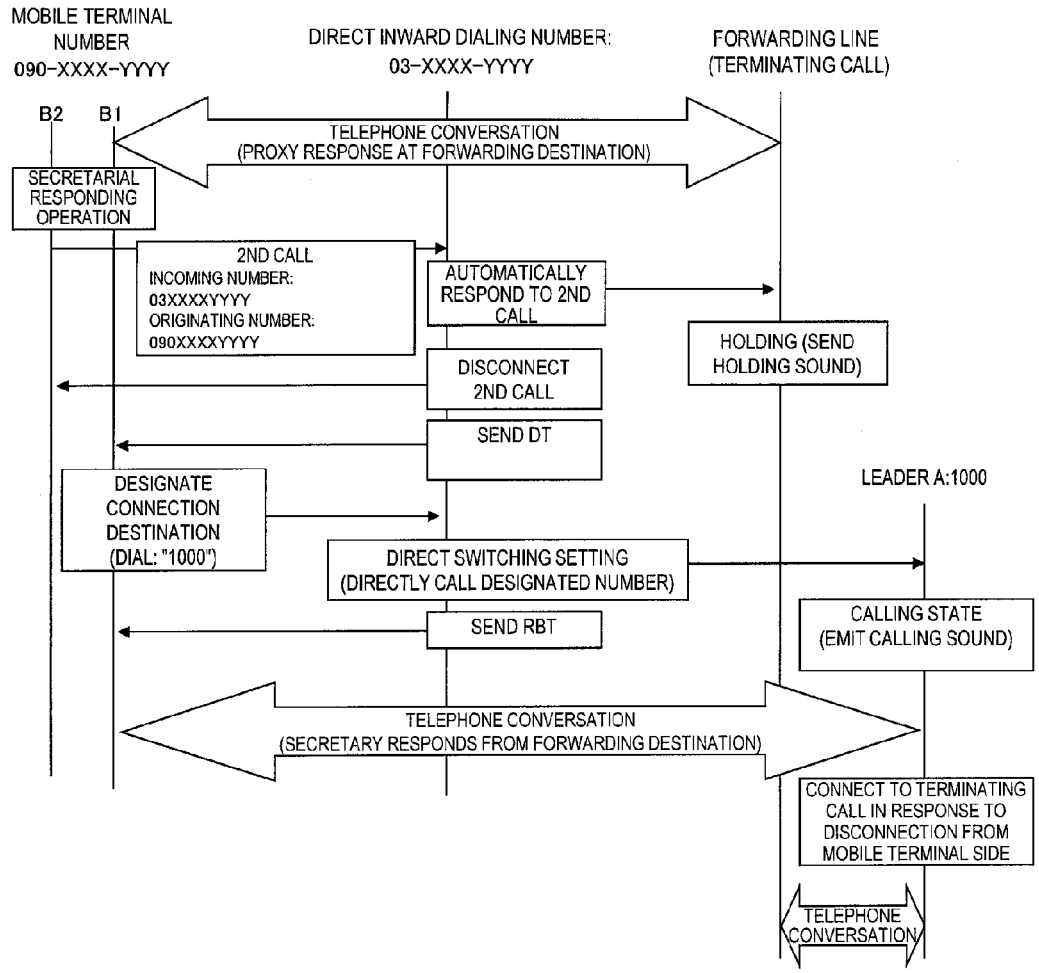
FIG. 8 is a diagram illustrating an example of processing for forwarding and holding an incoming call of the outside line within the telephone exchange system when there is the incoming call from the outside line and connecting the incoming call of the outside line to the proxy response destination finally.
Figure 9:
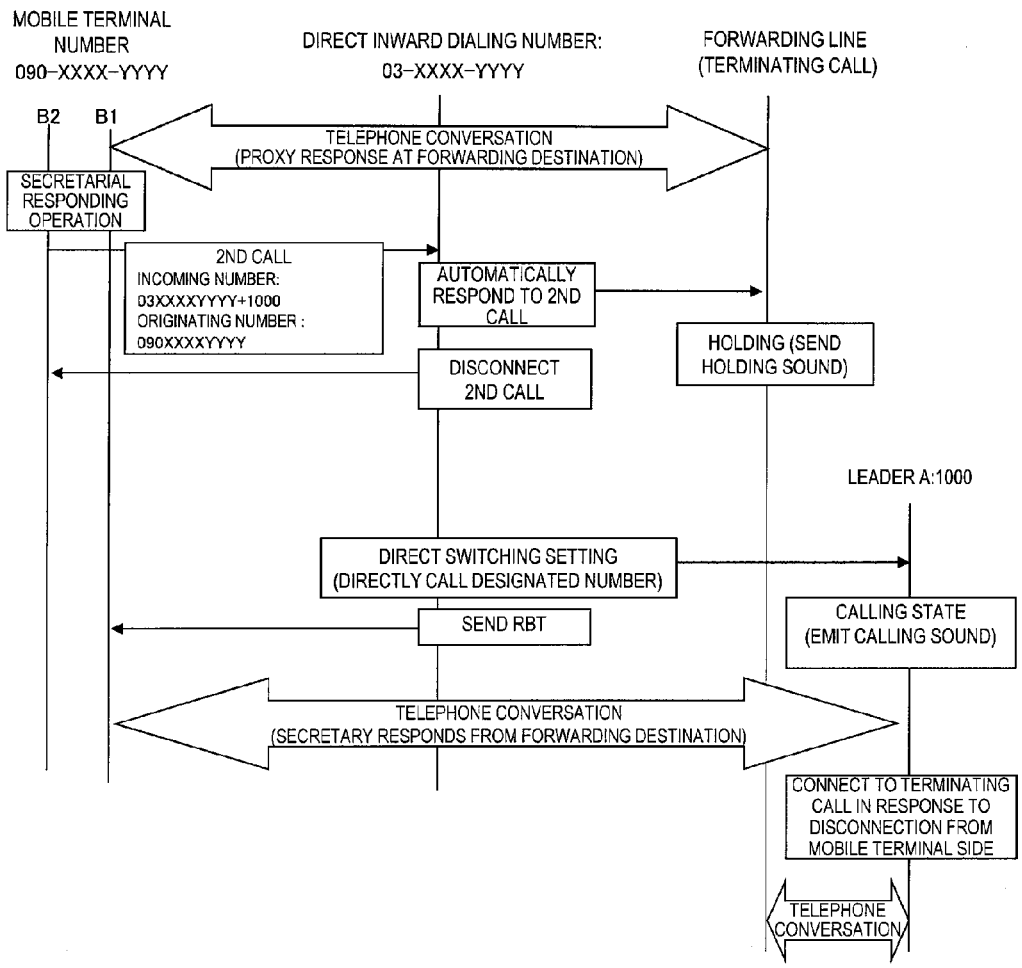
FIG. 9 is a diagram illustrating another example of processing for forwarding and holding the incoming call of the outside line within the telephone exchange system when there is the incoming call from the outside line and connecting the incoming call of the outside line to the proxy response destination finally.

FIG. 8 and FIG. 9 illustrate a processing flow for holding the incoming call until the forwarding-destination telephone terminal and the proxy-response-destination telephone terminal are connected to each other to finish the secretarial work after the secretary or the like responds to the incoming call to the proxy-response-destination telephone terminal. The flow illustrated in FIG. 8 is a processing example of a case where the additional number (sub-address) is not used, and the flow illustrated in FIG. 9 is a processing example of a case where the additional number is used. In FIG. 8 and FIG. 9, "2nd call" refers to a call made to the telephone exchange 10 via a public network from the telephone terminal that has already been in the telephone conversation. On the telephone exchange side, a B-channel line of the ISDN, a plurality of telephone numbers, or the like may be used. In the following description, a telephone exchange using the ISDN is used as an example.

The processing operation example of FIG. 8 in which the additional number is not used is briefly described. For a better understanding, brackets "(" ")" are used to add characters such as "secretary", "leader", and "telephone conversation requester".

Step 1: In response to an incoming call (incoming call to the leader) started by a telephone conversation requester, the telephone exchange 10 forwards the incoming call to the absent forwarding destination (the mobile telephone terminal) of a proxy response source telephone terminal (secretary).

Step 2: The incoming call (telephone conversation requester) and the mobile telephone terminal (secretary) are brought into a telephone conversation state. In this telephone conversation, the telephone conversation requester requests to be relayed to the telephone of the leader A. The secretary executes an operation for making a 2nd call from the mobile telephone terminal as the secretarial responding operation.

Step 3: The mobile telephone terminal makes a call to a B2-line of the ISDN during the telephone conversation with a forwarding line (incoming call), to activate the 2nd call. Note that, a direct inward dialing line with respect to the leader may be used. The mobile telephone terminal may be provided with a dedicated secretary software (application), but it suffices that the operator inputs a number for the 2nd call through a dial operation or from a phone directory. The mobile telephone terminal uses a free B-channel line (B2 line in FIG. 8 and FIG. 9) of the ISDN to set another call.

Step 4: The telephone exchange 10 receives the incoming call serving as the 2nd call, identifies caller number information (calling number) or the like, discriminates a receiving call of the 2nd call, internally operates the B1 connected to the mobile telephone terminal into a hooking state, and shifts the terminating call (telephone conversation requester) to a holding state. The B2-line may be disconnected as soon as automatic response processing is finished. At the same time, the telephone exchange 10 causes the mobile telephone terminal (secretary) to listen to a dial tone, to notify that dialing is ready to be received. Note that, with the dedicated software, the B2-line may be used to receive a selection of the connection destination by data communications. During this processing, a large-scale exchange may notify the secretary side of the holding number as necessary.

Step 5: The telephone exchange 10 receives the dialing of the extension number ("1000") of the connection destination (leader A) from the mobile telephone terminal (secretary), refers to the direct switching setting table or the like to carry out a number analysis of the received dial number, discriminates whether to directly conduct the "incoming call override" or conduct the "sliding operation" based on the comparison processing between the telephone number of the incoming call or the like and the set telephone number or the like, and calls a connection destination telephone terminal (telephone terminal of the leader A).

Step 6: When the leader A responds thereto, the mobile telephone terminal (secretary) and the connection destination telephone terminal (leader A) are shifted to the telephone conversation state. The secretary informs the leader A that the forwarding is to be followed.

Step 7: When the call is disconnected from the mobile telephone terminal side, or when an operation for responding to the holding call or other such operations is received from the connection destination telephone terminal (telephone terminal of the leader A), the incoming call (telephone conversation requester) being held and the connection destination telephone terminal (leader A) are shifted to the telephone conversation state. At this point in time, the mobile telephone terminal (secretary) returns to an initial state. Note that, the telephone exchange system may be provided with the mechanism for shifting the leader A, the telephone conversation requester, and the secretary to a 3-way calling state thereamong as necessary.

Next, the processing operation example of FIG. 9 in which the additional number is used is briefly described. Parts relating to Step 1 and Step 2 are the same as in the processing operation in which the additional number is not used.

Step 3: The mobile telephone terminal makes a call to the B2-line of the ISDN during the telephone conversation with the forwarding line (incoming call), to activate the 2nd call. At this instance, a sub-address is added to the originating call.

Step 4: The telephone exchange 10 receives the incoming call serving as the 2nd call, identifies caller number information (calling number * sub-address) or the like, discriminates the receiving call of the 2nd call, subjects the B1 of the mobile telephone terminal into the hooking state, and shifts the terminating call (telephone conversation requester) to the holding state. The telephone exchange 10 may disconnect the B2-line as soon as automatic response processing is finished.

Step 5: The telephone exchange 10 refers to the direct switching setting table or the like based on the additional number ("1000") included in the incoming number to discriminate whether to directly conduct the "incoming call override" or conduct the "sliding operation", and calls the connection destination telephone terminal (telephone terminal of the leader A).

The subsequent parts are the same as in the processing operation in which the additional number is not used.

Note that, for the telephone terminal incapable of a simultaneous telephone conversation, the telephone exchange system may be provided with a mechanism (for example, identification of a predetermined push-button tone string) in which the telephone exchange 10 receives holding from the mobile telephone terminal during the proxy response at the forwarding destination. After the holding, the operation may be conducted so that the incoming call is received from the mobile telephone terminal and subjected to the "incoming call override" to connect the incoming call being held to the connection destination telephone terminal as described above.

By the above-mentioned operation of the telephone exchange 10, the secretarial work can be continued even with many kinds of general cellular phone, PHS, softphone, or the like.

Note that, the respective devices constructing the telephone exchange system may be realized by using a combination of hardware and software. In a mode that combines hardware and software, a proxy response program according to this invention is loaded into a RAM together with other programs relating to the telephone exchange system, and the hardware such as a control unit (CPU) is operated based on the programs. Based thereon, the respective units are operated as various kinds of means. Further, this program may be recorded on a recording medium in a fixed manner and distributed. The program recorded on the recording medium is read into the memory in a wired manner, in a wireless manner, or via the recording medium itself, to operate the control unit or the like. Note that, examples of the recording medium include an optical disc, a magnetic disk, a semiconductor memory device, and a hard disk drive.

To describe the above-mentioned mode in another expression, an information processing device operated as a telephone exchange can be realized by operating the control unit as a proxy response unit, a sliding-forwarding unit, an absent forwarding unit, a direct switching setting unit, and the like based on the above-mentioned program loaded into the RAM. Further, the program may be created so as to realize the direct switching setting unit in addition to the proxy response unit, the sliding-forwarding unit, the absent forwarding unit, and the like based on existing programs.

As described above, the telephone exchange system to which this invention is applied is capable of notifying the proxy response requester of the incoming call to the predetermined proxy responder to be subjected to the proxy response directly from the arbitrary telephone terminal.

Further, the arbitrary telephone terminal set by the predetermined proxy responder is capable of connecting directly to the proxy response requester.

In other words, according to this invention, it is possible to provide the telephone exchange system capable of notifying the proxy response requester of the incoming call to the predetermined proxy responder to be subjected to the proxy response directly from the arbitrary telephone terminal.

Further, according to this invention, it is possible to provide the telephone exchange system capable of connecting directly to the proxy response requester from the arbitrary telephone terminal set by the predetermined proxy responder.

Further, a specific configuration of this invention is not limited to the above-mentioned embodiment mode, and this invention covers any replacement of processing, any configuration change in setting information, and the like that fall within the scope that does not depart from the gist of this invention.

Further, part or whole of the above-mentioned embodiments can also be described as follows. Note that, the following supplementary notes are not intended to limit this invention.

[Supplementary Note 1]

A telephone exchange system, including a control unit for conducting, in a case where a forwarding setting is enabled for a telephone terminal or telephone number that receives a proxy response to an incoming telephone call to a predetermined proxy response destination under a set environment in which a proxy response function is in operation, switching control for conducting processing for connecting the incoming telephone call directly to the predetermined proxy response destination when the incoming telephone call to the predetermined proxy response destination from the telephone terminal or telephone number of a forwarding destination within the forwarding setting is identified.

[Supplementary Note 2]

A telephone exchange system according to the above mentioned supplementary note, in which the control unit conducts, when the incoming telephone call to the predetermined proxy response destination is identified under a set environment in which both the proxy response function and a sliding-forwarding function are in operation, switching control for identifying presence or absence of the forwarding setting enabled for the telephone terminal or telephone number that is set as the predetermined proxy response destination and that receives the proxy response, carrying out comparison processing between a call source of the incoming telephone call and the forwarding setting, and when there is a match therebetween, connecting the incoming telephone call directly to the predetermined proxy response destination without conducting sliding-forwarding.

[Supplementary Note 3]

A telephone exchange system according to the above mentioned supplementary note, in which the control unit conducts, when the incoming telephone call to the predetermined proxy response destination is identified, switching control for identifying the presence or absence of the forwarding setting enabled for a top-priority telephone terminal or telephone number in the sliding-forwarding function that is set as the predetermined proxy response destination and that receives the proxy response, carrying out the comparison processing between the call source of the incoming telephone call and the forwarding setting, and when there is a match therebetween, connecting the incoming telephone call directly to the predetermined proxy response destination.

[Supplementary Note 4]

A telephone exchange system according to the above mentioned supplementary note, in which the control unit conducts, when the incoming telephone call to the predetermined proxy response destination is identified, switching control for identifying the presence or absence of the forwarding setting enabled for the top-priority telephone terminal or telephone number in the sliding-forwarding function that is set as the predetermined proxy response destination and that receives the proxy response, carrying out the comparison processing between the call source of the incoming telephone call and the forwarding setting, and when there is not a match therebetween, connecting the incoming telephone call to a next-prioritized telephone terminal or telephone number in the sliding-forwarding function.

[Supplementary Note 5]

A telephone exchange system according to the above mentioned supplementary note, in which the presence or absence of the forwarding setting is identified by referring to the forwarding setting having a table information format.

[Supplementary Note 6]

A telephone exchange, including:

a proxy response unit for allowing a predetermined number to be set as a proxy response destination based on information set in advance, and forwarding an incoming telephone call to the predetermined number to a telephone terminal or number associated with the proxy response destination as a proxy response source;

a forwarding unit for forwarding a call corresponding to the incoming telephone call to the telephone terminal or number serving as the proxy response source to an incoming telephone call to a telephone terminal or number based on a forwarding setting set by a proxy responder; and a switching unit for identifying, when the forwarding setting is enabled in the telephone terminal or telephone number that receives a proxy response to the incoming telephone call to a predetermined proxy response destination under a set environment in which the proxy response unit is in operation, whether or not the incoming telephone call is the incoming telephone call to the predetermined proxy response destination from the telephone terminal or telephone number of a forwarding destination within the forwarding setting, and conducting processing for connecting, directly to the predetermined proxy response destination, the incoming telephone call from the telephone terminal or number indicated in the forwarding setting.

[Supplementary Note 7]

A telephone exchange according to the above mentioned supplementary note, further including: a sliding-forwarding unit for forwarding, based on information set in advance, the call corresponding to the incoming telephone call to a different telephone terminal or number in a predetermined order with a lapse of time, in which the switching unit identifies, when the forwarding setting is enabled in the telephone terminal or telephone number that receives the proxy response to the incoming telephone call to the predetermined proxy response destination under a set environment in which both the proxy response unit and the sliding-forwarding unit are in operation, whether or not the incoming telephone call is the incoming telephone call to the proxy response destination from the telephone terminal or telephone number of the forwarding destination within the forwarding setting, and conducts processing for connecting directly to the proxy response destination, the incoming telephone call from the telephone terminal or the number indicated in the forwarding setting without conducting sliding-forwarding.

[Supplementary Note 8]

A telephone exchange according to the above mentioned supplementary note, in which wherein the switching unit is configured to:

carry out comparison processing between a call source of the incoming telephone call and the forwarding setting; and connect the incoming telephone call directly to the predetermined proxy response destination when there is a match therebetween, and cause the incoming telephone call to operate in accordance with a processing operation of another function when there is not a match therebetween.

[Supplementary Note 9]

A telephone exchange according to the above mentioned supplementary note, in which wherein the switching unit is configured to:

carry out comparison processing between a call source of the incoming telephone call and the forwarding setting; and connect the incoming telephone call directly to the predetermined proxy response destination when there is a match therebetween, and connect the incoming telephone call to a next-prioritized telephone terminal or telephone number set in the sliding-forwarding unit when there is not a match therebetween.

[Supplementary Note 10]

A telephone exchange according to the above mentioned supplementary note, in which wherein the switching unit carries out the comparison processing between the call source of the incoming telephone call and the forwarding setting by identifying the presence or absence of the forwarding setting only for a top-priority telephone terminal or telephone number in forwarding based on the sliding-forwarding unit.

[Supplementary Note 11]

A telephone exchange according to the above-mentioned supplementary note, in which the connection processing is executed to the proxy response destination from a telephone terminal of a forwarding processing destination while retaining holding relating to the incoming telephone call subjected to forwarding processing for secretarial work, and when the telephone exchange is then disconnected from the telephone terminal of the forwarding processing destination, the holding is subjected to the connection processing to the proxy response destination.

[Supplementary Note 12]

A telephone exchange according to the above mentioned supplementary note, in which each forwarding setting is set in a table information format.

[Supplementary Note 13]

An incoming call switching method, comprising conducting, by a control unit of a telephone exchange system for conducting switching control for an incoming telephone call in which a proxy response function is in operation, when an incoming call is identified, switching control for conducting, in a case where a forwarding setting is enabled for a telephone terminal or a telephone number that receives a proxy response to the incoming call, processing for connecting the incoming call directly to a proxy response destination when the incoming call to a proxy response destination from the telephone terminal or telephone number of a forwarding destination within the forwarding setting is identified.

[Supplementary Note 14]

An incoming call switching method according to the above-mentioned supplementary note, in which:

the telephone exchange system further includes a sliding-forwarding function; and the incoming call switching method further includes conducting, by the control unit, when the incoming call is identified, switching control for conducting, in a case where the forwarding setting is enabled for the telephone terminal or telephone number that receives the proxy response to the incoming call, the processing for connecting the incoming call directly to the proxy response destination without conducting sliding-forwarding when the incoming call to the proxy response destination from the telephone terminal or telephone number of the forwarding destination within the forwarding setting is identified.

[Supplementary Note 15]

An incoming call switching method according to the above mentioned supplementary note, further including:

carrying out, by the control unit, comparison processing between a call source of the incoming telephone call and the forwarding setting; and connecting, by the control unit, the incoming telephone call directly to the predetermined proxy response destination when there is a match therebetween, and causing the incoming telephone call to operate in accordance with a processing operation of another function when there is not a match therebetween.

[Supplementary Note 16]

An incoming call switching method according to the above mentioned supplementary note, further including:

carrying out, by the control unit, comparison processing between a call source of the incoming telephone call and the forwarding setting; and connecting, by the control unit, the incoming telephone call directly to the predetermined proxy response destination when there is a match therebetween, and connecting the incoming telephone call to a next-prioritized telephone terminal or a next-prioritized telephone number set in a sliding-forwarding unit when there is not a match therebetween.

[Supplementary Note 17]

An incoming call switching method according to the above mentioned supplementary note, further including carrying out, by the control unit, the comparison processing between the call source of the incoming telephone call and the forwarding setting by identifying the presence or absence of the forwarding setting only for a top-priority telephone terminal or a top-priority telephone number in forwarding based on the sliding-forwarding unit.

[Supplementary Note 18]

An incoming call switching method according to the above-mentioned supplementary note, in which the connection processing is executed to the proxy response destination from a telephone terminal of a forwarding processing destination while retaining holding relating to the incoming telephone call subjected to forwarding processing for secretarial work, and when the telephone exchange is then disconnected from the telephone terminal of the forwarding processing destination, the holding is subjected to the connection processing to the proxy response destination.

[Supplementary Note 19]

An incoming call switching method according to the above mentioned supplementary note, wherein each forwarding setting is set in a table information format.

[Supplementary Note 20]

A telephone exchange system, including:

a proxy response unit;

an absent forwarding unit; and a switching setting unit for making, under an environment in which the proxy response unit is in operation and in a case where a forwarding setting is enabled for a telephone terminal or a telephone number that receives a proxy response to an incoming telephone call to a predetermined proxy response destination by the absent forwarding unit, such a setting as to connect the incoming telephone call directly to the predetermined proxy response destination when the incoming telephone call to the predetermined proxy response destination received from the telephone terminal or the telephone number of a forwarding destination within the forwarding setting is identified.

[Supplementary Note 21]

A telephone exchange system according to supplementary Note 20, further including a sliding-forwarding unit, in which the switching setting unit makes, when the incoming telephone call to the predetermined proxy response destination is identified under an environment in which the proxy response unit, the absent forwarding unit, and the sliding-forwarding unit are operated, such a setting as to identify presence or absence of the forwarding setting enabled for the telephone terminal or the telephone number that is set as the predetermined proxy response destination and that receives the proxy response, compare a call source of the incoming telephone call with the forwarding setting, and when there is a match therebetween, connect the incoming telephone call directly to the predetermined proxy response destination without conducting sliding-forward.

[Supplementary Note 22]

A telephone exchange system according to the above-mentioned supplementary note, in which the telephone exchange system includes a plurality of telephone exchanges each including the switching setting unit operating in cooperation with one another.

This application claims priority based on Japanese Patent Application No. 2013-029839, filed on Feb. 19, 2013, the entire disclosure of which is incorporated herein.

REFERENCE SIGNS LIST telephone exchange system
10, 10a, 10b, 10c telephone exchange (telephone exchange unit, telephone exchange means)
11 proxy response unit (proxy response means)
12 sliding-forwarding unit (sliding-forwarding means)
13 absent forwarding unit (absent forwarding means)
14 direct switching setting unit (direct switching setting means)
15 forwarding setting exchange unit (forwarding setting exchange means)

The invention claimed is:

1. A telephone exchange system, comprising:
   a control unit, operable in a set environment wherein a proxy response function and a sliding-forwarding function are operated for each incoming telephone call to process an incoming telephone call directed to a predetermined proxy response destination,
   wherein said control unit is operable to respond to a proxy response for said predetermined proxy response destination, to refer to a forwarding setting set up to a top-priority telephone terminal or a top-priority telephone number within the sliding-forwarding function in response to the above-mentioned proxy response, and to conduct exchange control of an incoming telephone call by directly connecting the incoming telephone call to the proxy response destination without carrying out the sliding-forwarding function, when a call source of the incoming telephone call is matched with the top-priority telephone terminal or the top-priority telephone number.

2. A telephone exchange system according to claim 1, wherein, when the incoming telephone call to the predetermined proxy response destination is identified, the control unit switches control for identifying the presence or absence of the forwarding setting enabled for the top-priority telephone terminal or the top-priority telephone number in the sliding-forwarding function that is set as the predetermined proxy response destination and that receives the proxy response, carries out the comparison processing between the call source of the incoming telephone call and the forwarding setting, and, when there is not a match therebetween, connects the incoming telephone call to a next-prioritized telephone terminal or a next-prioritized telephone number in the sliding-forwarding function.

3. A telephone exchange system according to claim 1, wherein the presence or absence of the forwarding setting is identified by referring to the forwarding setting of a table information format.

4. A telephone exchange, comprising:
   a proxy response unit to allow a predetermined number to be set as a proxy response destination based on information set in advance, and to forwarding an incoming telephone call to the predetermined number to a telephone terminal or a number associated with the proxy response destination as a proxy response source;
   a sliding-forwarding unit to forward, based on information set in advance, a call corresponding to the incoming telephone call to different telephone terminals or numbers in a predetermined order with a lapse of time;
   a forwarding unit to automatically forward the call corresponding to the incoming telephone call to the telephone terminal or the telephone number serving as the proxy response source to the telephone terminal or the telephone number based on a forwarding setting set by a proxy responder; and
   a switching unit, operable in a set environment wherein a proxy response function and a sliding forwarding function are operated for each incoming telephone call to process an incoming telephone call directed to a predetermined proxy response destination,
   wherein said control unit is operable to respond to a proxy response for said predetermined proxy response destination, to refer to a forwarding setting set up to a top-priority telephone terminal or a top-priority telephone number within the sliding-forwarding function in response to the above-mentioned proxy response, and to conduct exchange control of an incoming telephone call by directly connecting the incoming telephone call to the proxy response destination without carrying out the sliding-forwarding function, when a call source of the incoming telephone call is matched with the top-priority telephone terminal or the top-priority telephone number.

5. A telephone exchange according to claim 4, wherein the switching unit is configured to:
   compare a call source of the incoming telephone call and the forwarding setting; and
   connect the incoming telephone call directly to the predetermined proxy response destination when there is a match therebetween, and to connect the incoming telephone call to a next-prioritized telephone terminal or a next-prioritized telephone number set in the sliding-forwarding unit when there is not a match therebetween.

6. A telephone exchange according to claim 4, wherein each forwarding setting is set in a table information format.

7. An incoming call switching method, comprising a control unit which is used in a telephone exchange system for an incoming telephone call and in which both a proxy response function and a sliding-forwarding function are in operation, comprising:
   identifying an incoming call;
   determining whether or not a forwarding setting is made to a terminal or telephone number which receives a proxy response concerned with the incoming call;

identifying whether or not the terminal or the telephone number is directed to a proxy response destination when the incoming call is from the top-priority telephone terminal or the top-priority telephone number set up for the forwarding setting; and performing exchange control for directly connecting the incoming call to the proxy response destination without carrying out any sliding-forwarding, when the top-priority telephone terminal or the top-priority telephone number call is identified as being directed to the proxy response destination.

8. A telephone exchange according to claim 4, wherein the switching unit holds the incoming telephone call which is forwarded to the telephone terminal set up as a forwarding destination on the basis of a forwarding setting set by a proxy responder, and connects a call from the telephone terminal of the forwarding destination to the proxy response destination without conducting sliding-forwarding, wherein the switching unit connects the held incoming telephone call to the proxy response destination, when the call of the telephone terminal of the forwarding destination is disconnected from the proxy response destination.

9. An incoming call switching method according to claim 7, wherein the control unit compares a call source of the incoming telephone call and the forwarding setting, and connects the incoming telephone call directly to the predetermined proxy response destination when there is a match therebetween, and connects the incoming telephone call to a next-prioritized telephone terminal or a next-prioritized telephone number set in the sliding-forwarding function when there is not a match therebetween.

10. An incoming call switching method according to claim 7, wherein the control unit holds the incoming telephone call which is forwarded to the telephone terminal of the forwarding destination based on a forwarding setting set by a proxy responder, and connects a call from the telephone terminal of the forwarding destination to the proxy response destination without conducting sliding-forwarding, and, connects the held incoming telephone call to the proxy response destination, after the call of the telephone terminal of the forwarding destination is disconnected from the proxy response destination.

\* \* \* \* \*